United States Patent
Perry et al.

(10) Patent No.: US 12,450,818 B2
(45) Date of Patent: Oct. 21, 2025

(54) MACHINE-LEARNING BASED COLLISION DETECTION FOR OBJECTS IN VIRTUAL ENVIRONMENTS

(71) Applicants: ADVANCED MICRO DEVICES, INC., Santa Clara, CA (US); ATI TECHNOLOGIES ULC, Markham (CA)

(72) Inventors: Thomas Daniel Perry, Bellevue, WA (US); Gabor Sines, Markham (CA); Mehdi Saeedi, Markham (CA); Allen H. Rush, Santa Clara, CA (US); Michal Eugeniusz Gallus, Gdańsk (PL)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 1181 days.

(21) Appl. No.: 17/217,339

(22) Filed: Mar. 30, 2021

(65) Prior Publication Data

US 2022/0319096 A1    Oct. 6, 2022

(51) Int. Cl.
    G06F 30/20    (2020.01)
    G06N 3/02     (2006.01)
    G06T 15/06    (2011.01)
    G06T 17/20    (2006.01)

(52) U.S. Cl.
    CPC .............. G06T 15/06 (2013.01); G06N 3/02 (2013.01); G06T 17/205 (2013.01)

(58) Field of Classification Search
    CPC .......... G06T 15/06; G06T 17/205; G06N 3/02

USPC ............................................. 703/2
    See application file for complete search history.

(56) References Cited

U.S. PATENT DOCUMENTS

2019/0188895 A1* 6/2019 Miller, IV .............. H04N 7/157
2020/0301799 A1* 9/2020 Manivasagam ........ G01S 17/006
2020/0306632 A1* 10/2020 Kolen ...................... A63F 13/79
2021/0387584 A1* 12/2021 Daniels .................. G06V 20/58

OTHER PUBLICATIONS

Mrowca et al., "Flexible Neural Representation for Physics Prediction," Advances in Neural Information Processing Systems 31 (NeurIPS), Dec. 2018, 12 Pages.
Jiang et al., "Data-Augmented Contact Model for Rigid Body Simulation," arXiv.org, Sep. 23, 2018, <https://arxiv.org/abs/1803.04019v3>, Accessed Jul. 8, 2021, 7 pages.
Sanchez-Gonzalez et al., "Learning to Simulate Complex Physics with Graph Networks" Proceedings of the 37th International Conference on Machine Learning, Apr. 2020, 10 pages.

* cited by examiner

*Primary Examiner* — Andre Pierre Louis

(57) ABSTRACT

An apparatus includes a processor and a collision detection unit operatively coupled to the processor. The collision detection unit is configured to process, using a machine learning model, one or more parameters associated with a ray cast in virtual environment comprising an object. The machine learning model is configured to approximate a mesh representing the object. The collision detection unit is further configured to determine if the ray collides with the object based on processing the one or more parameters. In response to determining if the ray collides with the object, the collision detection unit is configured to generate collision data associated with the ray and the object.

20 Claims, 10 Drawing Sheets

MACHINE-LEARNING BASED COLLISION DETECTION FOR OBJECTS IN VIRTUAL ENVIRONMENTS

BACKGROUND

Collision detection is an integral part of computer graphics rendering. Collision detection generally refers to the process of determining whether two or more objects intersect (e.g., collide) with each other in a virtual environment. Collisions can occur between rigid bodies, soft bodies, rays, or a combination thereof. Various approaches, such as physics simulation, including rigid body simulation and ray casting, can be implemented to perform collision detection in a virtual environment. However, these and other approaches typically utilize bounding volume hierarchies, which generally trade accuracy for generality and also have high computational, both of which can lead to poor performance and user experience.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
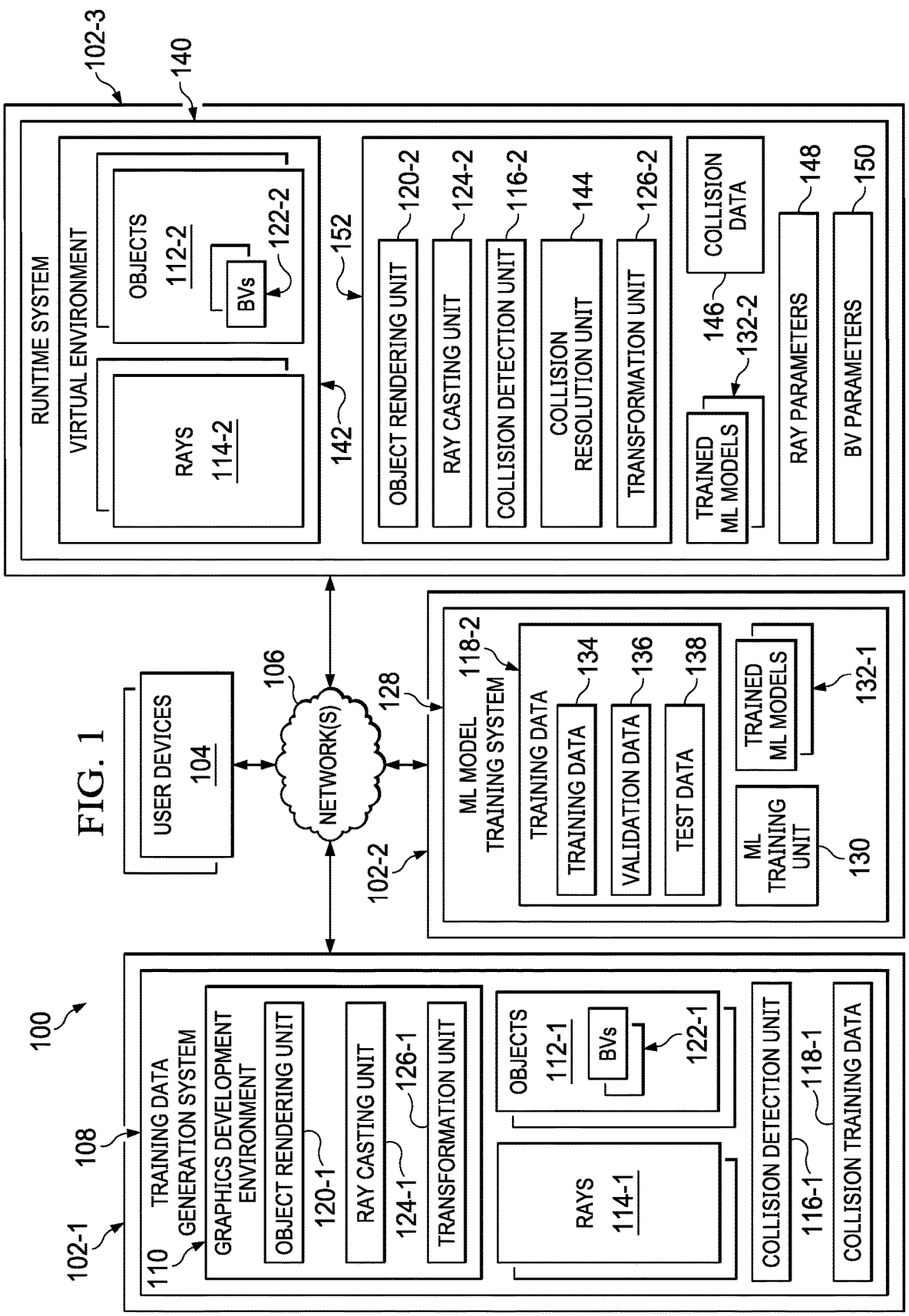
FIG. 1 is a block diagram of an operating environment for performing machine learning based collision detection on virtual objects in accordance with some embodiments.

Collision detection in a virtual environment, such as a video game, allows for various actions to be taken when one object collides with another object. For example, collision detection is performed to detect when an object, such as a ray, collides with a rigid body object. An action, such as shadow rendering, is then performed based on the detected collision. In many instances, collision detection is typically implemented using physics simulations. Physics simulations are generally performed on a processor in parallel with rendering and are usually a computationally intensive process. Rigid body simulation is one type of physics simulation that simulates the motion of rigid bodies in a virtual environment under the action of external forces. A rigid body is typically a solid object that has zero (or negligible) deformation. Rigid body simulation is used, for example, to detect collisions between rigid bodies based on, for example, primitive collisions (e.g., sphere vs. sphere), mesh collisions, and so on. Primitives are low-level objects, such as lines or polygons, that are combinable to create complex graphical images. A mesh is a collection of vertices, edges, and faces (e.g., triangles, quadrilaterals, etc.) of a three-dimensional (3D) object. Another type of physics simulation is ray casting for ray tracing. Ray casting is used, for example, to detect collisions between a ray, which is a semi-infinite line representing light, and a primitive or a mesh.

Collision detection between rigid bodies, or rigid bodies and rays, typically involves implementing an acceleration structure such as a bounding volume or collision mesh. For example, in many instances, a rendered mesh is simplified to a bounding volume or collision mesh that reflects the physics bounds of an object and produces more efficient collision detection. A complex object is able to be segmented into multiple instances, each being represented by a separate bounding volume. The collection of bounding volumes is referred to as a bounding volume hierarchy (BVH). Simplifying rendered meshes to one or more acceleration structures typically reduces collision detection accuracy since the acceleration structures include less detail and encompass a more general area than their corresponding rendered mesh. Also, traversing an acceleration structure for collision detection, such as a bounding volume hierarchy, involves complex branching that takes a relatively long time to compute for determining if a collision has occurred.

The present disclosure describes embodiments of systems and methods for overcoming various issues, including computational cost, associated with conventional collision detection techniques that implement acceleration structures such as bounding volume hierarchies. As described in greater detail below, a collision detection unit implements a trained machine learning model (ML) that approximates a mesh for a given object. In at least some embodiments, the trained ML model is utilized for detecting collisions on an object in a virtual environment in place of an acceleration structure, such as a bounding volume hierarchy. The trained ML model, in at least some embodiments, is generated for an object's mesh at design time to detect collisions on the object represented by the mesh. In at least some embodiments, the trained ML model detects various types of collisions, such as mesh to mesh collisions, mesh to primitive collisions, and mesh to ray collisions.

In at least some embodiments, the trained ML model is a neural network model having a specific structure that is configurable based on accuracy and performance requirements. The neural network model is configured to accept and process input comprising information about an object, such as a primitive, ray, or mesh. This information includes, for example, the object's position, orientation, scale, bounding volume, length, vertex positions, and so on. The neural network model generates output comprising collision detection information comprising information, such as the occurrence of a collision, the nearest distance of a collision, the penetration distance if there is a collision, the nearest impact point of a collision, and so on. The collision detection information, in at least some embodiments is received as input by other components in a graphics rendering environment, such as a collision resolution unit, that determines how to resolve the collision. In at least some embodiments, a rendering engine renders the colliding objects according to the data generated by the collision detection unit, collision resolution unit, and so on.

Collision detection utilizing a trained ML model that approximates an object's mesh allows for more accurate, efficient, and faster detection of collisions than techniques based on bounding volume hierarchies. For example, in a ray casting environment, the trained ML model allows for a close approximation of a mesh that quickly excludes rays for objects with many gaps in bounding volumes, such as a table or a chair. This technique allows for faster ray casting by quickly excluding such rays before performing a more detailed collision analysis on areas of the object more likely to experience collisions with a casted ray.

FIG. 1 illustrates an example operating environment 100 for performing ML based collision detection on objects in a virtual environment. As shown in FIG. 1, the operating environment 100 comprises one or more information processing systems 102 (shown as systems 102-1 to 102-3) and user devices 104. One or more networks 106 communicatively couple each of the systems 102 and user devices 104. Examples of information processing systems 102 include desktop computers, laptop/notebook computers, mobile devices, servers, or various other types of computing systems or devices. Examples of user devices 104 include desktop computers, laptop/notebook computers, mobile devices, gaming devices, tablet computing devices, wearable computing devices, or various other types of computing systems or devices. In at least some embodiments, users interact with the information processing systems 102 directly, through one or more of the user devices 104, and so on. The network(s) 106, in at least some embodiments, is implemented utilizing wired and or wireless networking mechanisms. For example, the network 106, in at least some embodiments, comprises wireless communication networks, non-cellular networks such as Wi-Fi networks, public networks such as the Internet, private networks, and so on. The wireless communication networks support any wireless communication standard and include one or more networks based on such standards.

In the example shown in FIG. 1, one or more information processing systems 102 generate collision detection training data, train ML models for collision detection, and implement the trained ML models for performing collision detection. It should be understood that the number of information processing systems 102 shown in FIG. 1 is for illustration purposes only. For example, a single system 102 or a lesser/greater number of information processing systems 102 are able to include the components and perform the operations described herein. In at least some embodiments, the user device(s) 104 also includes one or more of the components and perform one or more of the operations described herein for the information processing systems 102.

In at least some embodiments, the first information processing system 102-1 comprises a training data generation system 108. The training data generation system 108 includes, for example, a graphics development environment 110, modeled objects 112 (shown as objects 112-1), rays 114 (shown as rays 114-1), a collision detection unit 116 (shown as 116-1), and collision detection training data 118 (shown as 118-1). It should be understood that, in at least some embodiments, two or more of these components are part of the same unit. The graphics development environment 110, in at least some embodiments, includes software, hardware, or a combination thereof that enables a user (or software) to create and manage computer graphics for virtual environments such as video games, movies, simulations, and so on. One example of a graphics development environment 110 is a game engine. A game engine typically provides various development tools that allow a user to develop game logic, design/model, and render two-dimensional (2D) or three-dimensional (3D) graphics and objects (e.g., objects 112-1), simulate physics within a game, implement artificial intelligence within a game, develop and manage audio for a game, and so on.

The objects 112-1, in at least some embodiments, are 2D or 3D graphical objects to be rendered within a virtual environment. In at least some embodiments, the objects 112-1 are rendered in the virtual environment by an object rendering unit 120 (shown as 120-1) of the graphics development environment 110 or other software/hardware. Examples of objects 112-1 include characters, vehicles, buildings, trees, and so on. An object 112-1, for example, is a rigid body object or a soft body object. A rigid body object is typically a solid object that is not elastic, e.g., has zero (or negligible) deformation. In contrast, a soft body object is elastic and deformable.

An object 112-1 within a virtual environment is typically represented/modeled as a polygon mesh, which is a collection of vertices, edges, and faces defining the shape of a polyhedral object. The faces, in at least some embodiments, include triangles, quadrilaterals, and so on. However, in at least some embodiments, objects are represented using other techniques. As described in greater detail below, an object 112-1, in at least some embodiments, is associated with a bounding volume (BV) 122 (shown as BV 122-1). Rays 114-1, in at least some embodiments, are simulated light rays. The rays 114-1 are cast/rendered in the virtual environment by, for example, a ray casting unit 124 (shown as 124-1) of the graphics development environment 110 or other software/hardware. The ray casting unit 124-1, in at least some embodiments, is part of a ray tracing unit that is implemented within or separate from the graphics development environment 110. In at least some embodiments, the graphics development environment 110 also comprises a transformation unit 126 (shown as 126-1) configured to perform space transformations. For example, the transformation unit 126-1 transforms world space coordinates to local space coordinates, local space coordinates to world space coordinates, and so on.

The collision detection unit 116-1 is configured to detect collisions between the objects 112-1 (e.g., mesh-to-mesh collisions), between cast rays and objects 112-1 (e.g., ray-to-mesh collisions), and so on. A collision occurs when two objects 112-1 or a ray 114-1 and an object 112-1 intersect each other in the virtual environment. As will be described in greater detail below, the collision detection unit 116-1 and ray casting unit 124-1 generate collision detection training data 118-1 (also referred to herein as training data 118-1) for each modeled object 112-1 of interest. For example, if objects 112-1 are generated for a video game, the collision detection unit 116-1 generates training data 118-1 for each modeled object 112-1 that is able to interact with another object 112-1 or a ray 114-1. The training data 118 is utilized for training ML models associated with the objects 112-1 to detect collisions in a runtime system/environment (e.g., an executing video game, model or simulation, and so on). The collision detection unit 116-1, in at least some embodiments, is a standalone component or part of an environment such as a game engine. The collision detection unit 116-1, in at least some embodiments, is part of a ray tracing unit along with the ray casting unit 124-1. It should be understood that the training data generation system 108 is not limited to the configuration illustrated in FIG. 1, and other configurations are applicable as well.

In at least some embodiments, a second information processing system 102-2 includes a machine learning (ML) model training system 128. The ML model training system 128 includes, for example, the collision detection training data 118 (shown as 118-2), an ML training unit 130, and ML models 132 (shown as 132-1). The training data 118-2, in at least some embodiments, is partitioned into training datasets 134, validation datasets 136, and test datasets 138. As described in greater detail below, the ML training unit 130 utilizes the training data 118-2 to train the ML models 132-1. In at least some embodiments, an ML model 132-1 is trained for at least one of the objects 112-1. The trained ML models 132-1, in at least some embodiments, are associated with a given object 112-1 using a unique identifier (ID) of the object 112-1 or some other technique. The trained ML models 132-1 are subsequently used to detect collisions on objects 112. It should be understood the ML training system 128 is not limited to the configuration illustrated in FIG. 1, and other configurations are applicable as well.

Training of the ML models 132-1, in at least some embodiments, is performed using data comprising inputs and outputs for classification or regression based neural network training approach that uses various machine learning training cost/error functions. Classification training, in at least some embodiments, trains the ML models 132-1 for detecting the probability of a collision. Regression training, in at least some embodiments, is performed to assess the properties of the collision, such as penetration. Data generation for training, in at least some embodiments, is accomplished via stochastic methods, procedural methods, telemetry, hand generation, and so on. Stochastic methods involve, for example, random sampling of various input criteria from a physics simulation and using the output data from a physics simulation for training. Procedural methods involve, for example, placing objects incrementally or in programmatically defined positions and using the resulting output data from a physics simulation for training. Telemetry involves, for example, collecting data from a live production environment and logging the data for use as a training data set. Hand generated data involves, for example, carefully constructed training data samples where a person defines the inputs and outputs for the training. Multiple ML models 132-1, in at least some embodiments, are trained for different primitives (e.g., a cube). As such, in at least some embodiments, a complex object is divided into many primitives, and the ML models 132-1 for each primitive are called to detect collisions at different areas of the complex object.

A third information processing system 102-3, in at least some embodiments, includes a runtime system 140 implementing ML-based collision detection for objects 112 in a virtual environment 142. As used herein, a "runtime system" refers to software, hardware, or a combination thereof that is capable of implementing the ML-based collision detection techniques described herein. For example, the runtime system 140, in at least some embodiments, is a combination of software and hardware capable of executing a video game, simulation, etc., and detecting collisions on objects 112 within an executing virtual environment 142 of the video game. In another example, the runtime system 140 is the video game itself. The runtime system 140, in at least some embodiments, includes modeled objects 112 (shown as 112-2), rendered rays 114 (shown as 114-2), trained ML models 132 (shown as 132-2), a collision detection unit 116 (shown as 116-2), an object rendering unit 120 (shown as 120-2), a ray casting unit 124 (shown as 124-2), a transformation unit 126 (shown as 126-2), a collision resolution unit 144, and collision data 146, ray parameters 148, and BV parameters 150. In at least some embodiments, one or more of these components is part of another unit 152, such as a game engine, ML shader, ML engine, and so on. Also, in at least some embodiments, two or more of these components are part of the same unit/module. For example, the transformation unit 126-2, in at least some embodiments, is part of the collision detection unit 116-2. In another example, the collision detection unit 116-2 and the ray casting unit 124-2, in at least some embodiments, is part of a ray tracing unit.

The objects 112-2, in at least some embodiments, are the same objects 112-1 as those described with respect to the training data generation system 108. However, in at least some embodiments, the objects 112-2 are rendered within a virtual environment 142, such as an executing/running video game, simulation, etc., instead of a graphics development environment 110. In at least some embodiments, the objects 112-2 are associated with bounding volumes 122-2. The rays 114-2 represent simulated light rays generated/rendered within the virtual environment 142 during runtime. The trained ML models 132-2 are the trained ML models 132-1 generated by the ML model training system 128. As described in greater detail below, the collision detection unit 116-2 utilizes the trained ML models 132-2 to perform collision detection operations on the objects 112-2 and generates the collision data 146 based on these operations. The collision data 146 indicates, for example, whether a collision has occurred on a given object 112-2 and attributes or characteristics of a collision. The collision data 146, in at least some embodiments, is utilized by various components to perform one or more operations based thereon. For example, a collision resolution unit 144, in at least some embodiments, uses the collision data 146 to determine how the motion of colliding objects 112-2 should be changed, how the surface of an object 112-2 should be changed based on a ray 114-2 colliding with the object 112-2, and so on. The object rendering unit 120-2, in at least some embodiments, then uses the data generated by the collision resolution unit 144 to render the object 112-2 in the virtual environment 142 based on a detected collision. It should be understood the runtime system 140 is not limited to the configuration illustrated in FIG. 1, and other configurations are applicable as well.

Figure 2:
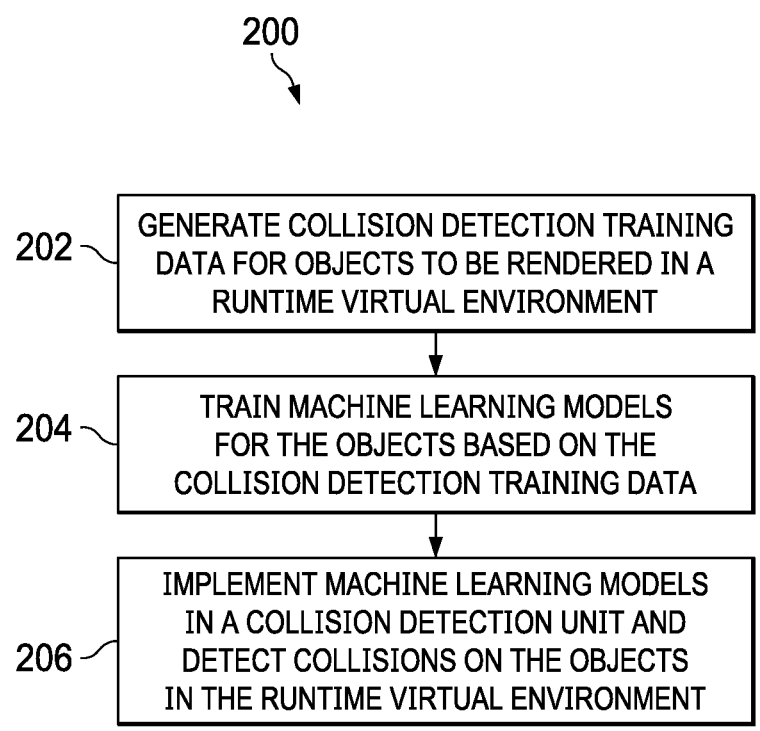
FIG. 2 is a flow diagram illustrating an overall example method for performing machine learning based collision detection on virtual objects in accordance with some embodiments.

FIG. 2 illustrates, in flow chart form, an overview of one example method 200 for performing collision detection on objects in a runtime virtual environment using machine learning techniques. It should be understood that although the remaining discussion uses ray-object collision detection as one example of collision detection, embodiments are not limited to such an example. For example, the ML-based collision detection techniques described herein apply to other types of collisions, such as object to object collisions. Referring now to FIG. 2, the training data generation system 108, at block 202, generates collision detection training data 118-1 for objects 112-1 to be rendered in a runtime virtual environment 142. The ML model training system 128, at block 204, trains ML models 132-1 based on the collision detection training data 118-2. The collision detection unit 116-2 of the runtime system 140, at block 206, implements the trained ML models 132-2 and detects collisions on the objects 112-2 in the runtime virtual environment 142 using the trained ML models 132-2.

Figure 3:
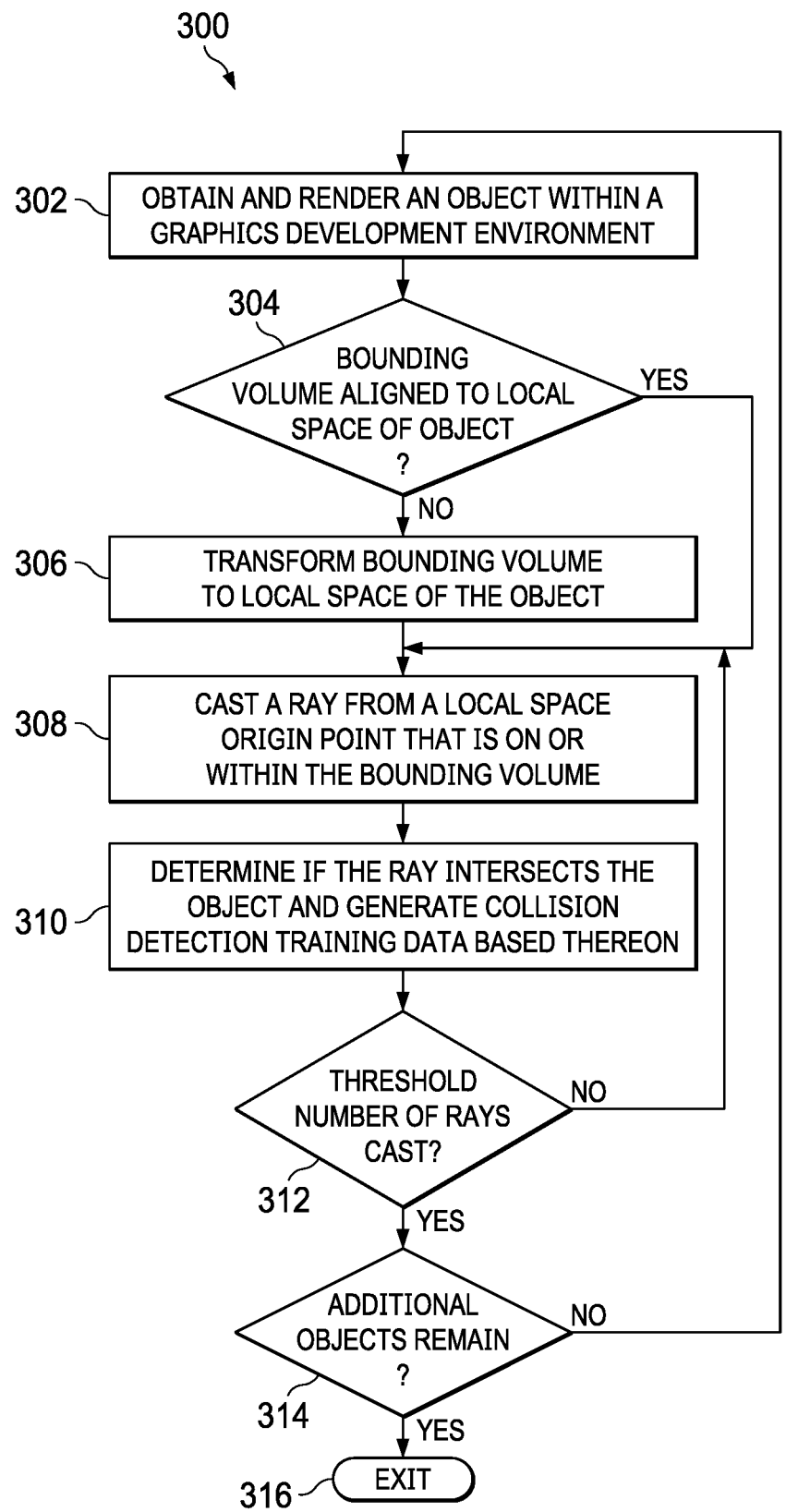
FIG. 3 is a flow diagram illustrating an example method for generating training data to train collision detection machine learning models in accordance with some embodiments.
Figure 7:
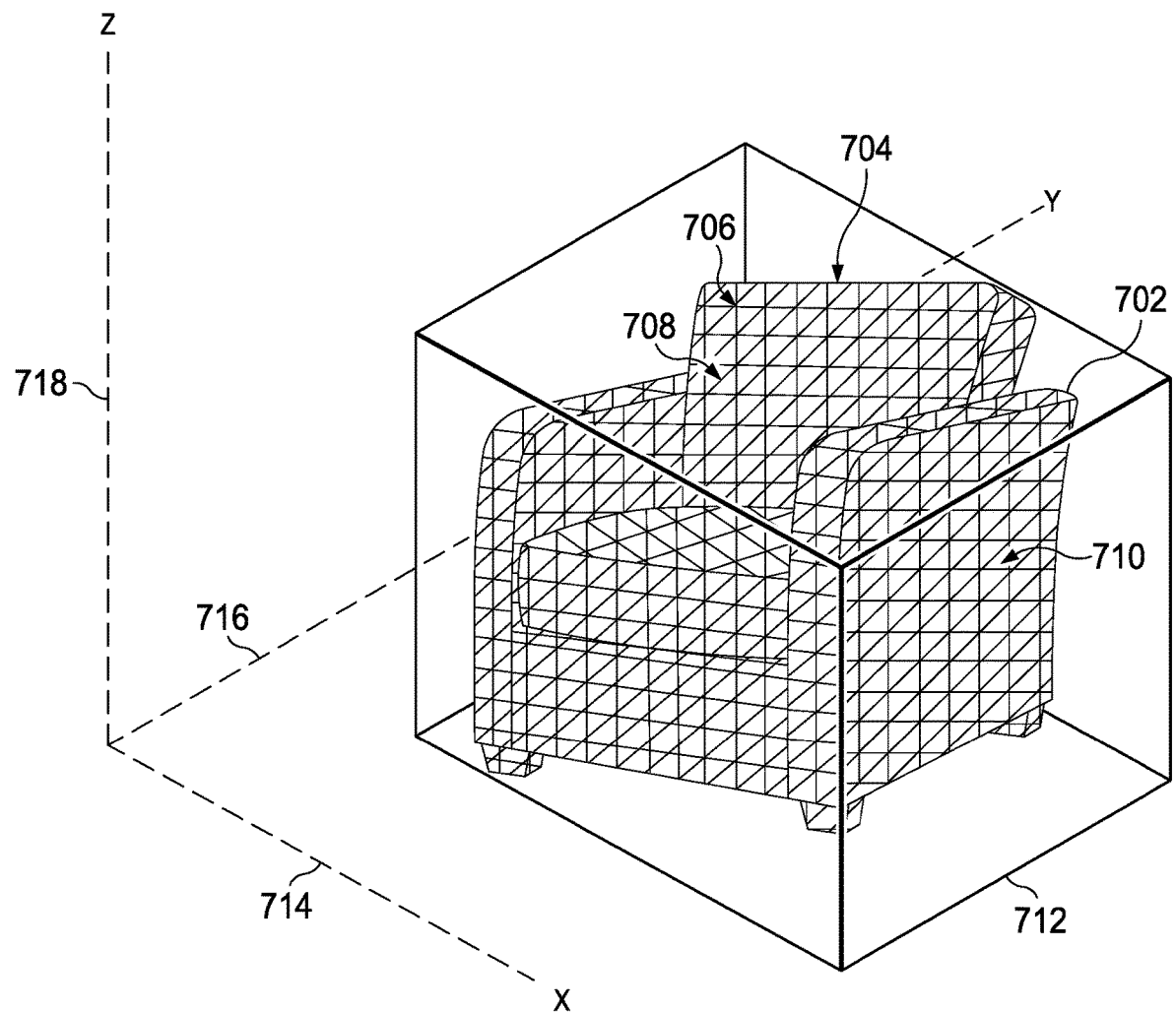
FIG. 7 is a diagram illustrating an example of a rigid-body object that has been modeled using a polygon mesh technique in accordance with some embodiments.

FIG. 3 illustrates, in flow chart form, one example of a more detailed method 300 for the training data generation process illustrated in block 202 of FIG. 2. An object 112-1, at block 302, is obtained and rendered in the graphics development environment 110 by the object rendering unit 120-1. The object 112-1, in at least some embodiments, is obtained by modeling the object 112-1 in the graphics development environment 110. In some embodiments, the object 112-1 is a reusable object previously modeled or an object that is imported into the graphics development 110. The object 112-1, in at least some embodiments, is a rigid body object represented/modeled using a polygon mesh technique. FIG. 7 shows one example of rigid-body object 702 modeled using a polygon mesh technique. In this example, the object 702 is a 3D representation of a chair that has been modeled using a triangle mesh 704. The triangle mesh comprises vertices 706, edges 708, and triangle faces 710. It should be understood that embodiments are not limited to triangle meshes and apply to any polygon mesh configuration.

As part of the modeling or rendering process, a bounding volume 122-1 is generated for the object 112-1. A bounding volume 122-1 is a closed volume that entirely encompasses the object 112-1 and implemented to detect collisions on the object 112-1. Using a bounding volume 122-1 to detect collisions reduces computational resources and time since bounding volumes are less complex than the polygon meshes contained therein. Examples of a bounding volume include bounding boxes, bounding spheres, and so on. A bounding box is typically the smallest cuboid (3D object) or rectangle (2D object) with vertical and horizontal sides that completely surround the object 112-1. Examples of a bounding box include an axis-aligned bounding box (AABB) and an oriented bounding box (OBB). The edges of an AABB are mutually perpendicular and are typically aligned with the world coordinate system axes (i.e., an AABB is not rotated). All box planes of an AABB are parallel to one of the XY, YZ, XZ planes of the world coordinate system, and all polygonal vertices that represent the object 112-1 are entirely contained within the AABB. In contrast, the edges of an OBB are typically aligned with the object's local coordinate system (i.e., an OBB is rotated). A bounding sphere is typically the smallest sphere (3D object) or circle (2D object) that completely surrounds the object of interest. It should be understood that embodiments are not limited to the types of bounding volumes described herein.

One example of a bounding volume 712, such as an AABB, is illustrated in FIG. 7. As shown, the bounding volume 712 entirely encompassed the object 702 and is aligned to the world coordinate system x-axis 714, y-axis 716, and z-axis 718. It should be understood that embodiments are not limited to a cartesian coordinate system, and any coordinate system applies to the techniques described herein. In some instances, an object 112 is partitioned into multiple portions, and a bounding volume is generated for each of these portions. These multiple bounding volumes form a bounding volume hierarchy (BVH) for the object. A BVH represents a tree-like structure of bounding volumes with a root bounding volume, one or more parent bounding volumes, and one or more child bounding volumes. One disadvantage of using BVHs for collision detection is that BVHs involve complex branches that take a relatively long time to compute when determining if a collision has occurred. As described in greater detail below, the use of BVHs, in at least some embodiments, is avoided by implementing the trained ML models 132 described herein.

Returning to FIG. 3, once the object 112-1 has been rendered, the training data generation system 108, at block 304, determines if the bounding volume 122-1 of the object 112-1 is aligned to world space coordinates or the local space coordinates of the object 112-1. If the bounding volume 122-1 is aligned to the local space of the object 112-1, the flow proceeds to block 308. However, if the bounding volume 122-1 is aligned to the world space of the virtual environment 142, the transformation unit 126, at block 306, performs a space transformation process (e.g., inverse transformation) such that the bounding volume 122-1 is aligned with the local space coordinates of the object 112-1.

Figure 8:
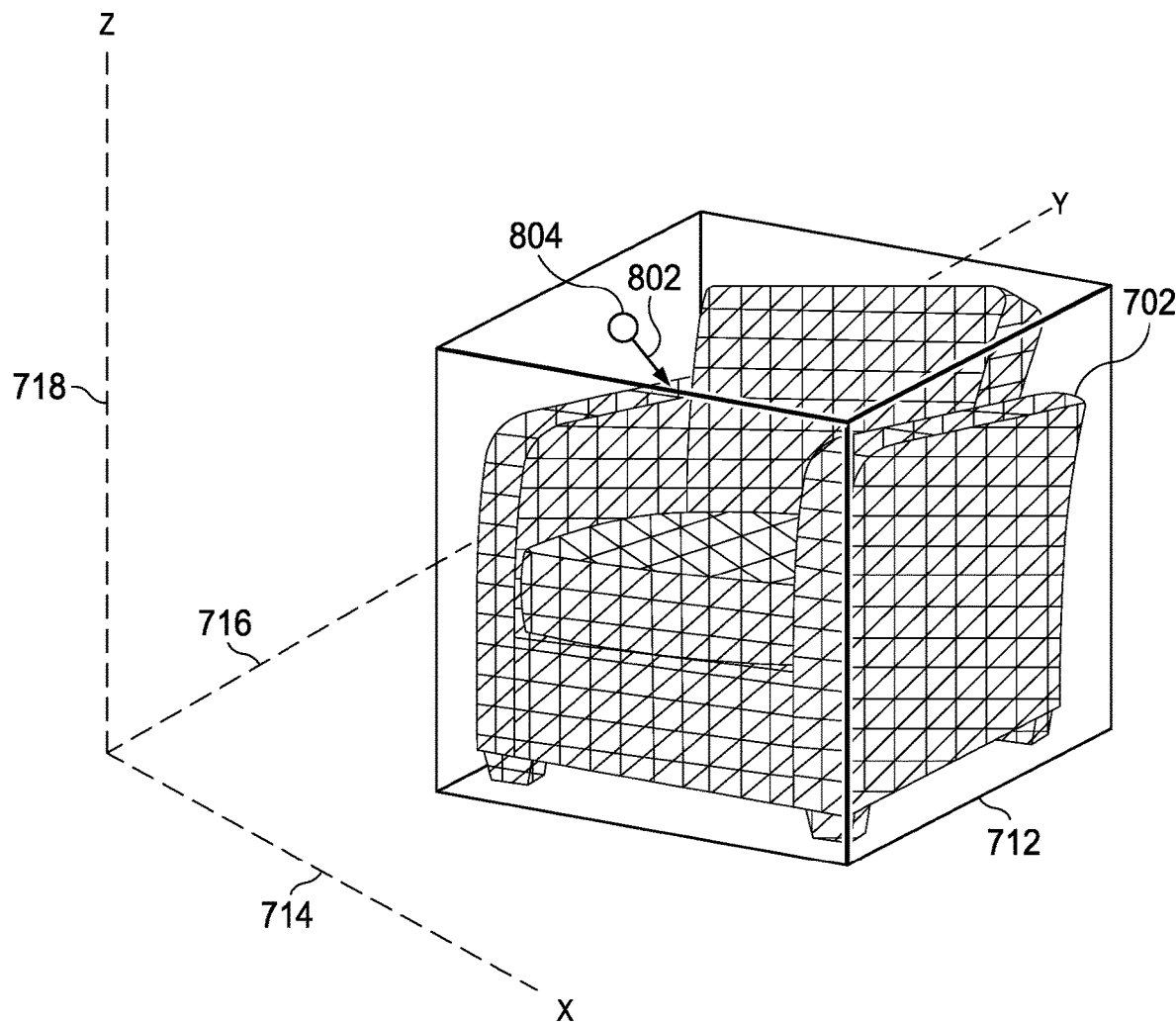
FIG. 8 is a diagram illustrating a ray being cast from a bounding volume of the rigid-body object of FIG. 7 to generate training data for machine learning models in accordance with some embodiments.

The ray casting unit 124-1, at block 308, casts a ray 114-1 from a local space origin point on or within the bounding volume 122-1. In at least some embodiments, the ray 114-1 is not cast from an origin point outside of the bounding volume 122-1 and does not run coincidental to the bounding volume 122-1. Also, the direction of the ray 114-1 is facing the interior of the bounding volume 122-1. For example, FIG. 8 shows one example of a ray 802 generated from a point 804 in local space on (or within) the bounding volume 712 of the object 702. As shown, the direction of the ray 802 is facing the interior of the bounding volume 712. In at least some embodiments, the ray's origin point is randomized on or within the bounding volume 122-1.

Figure 9:
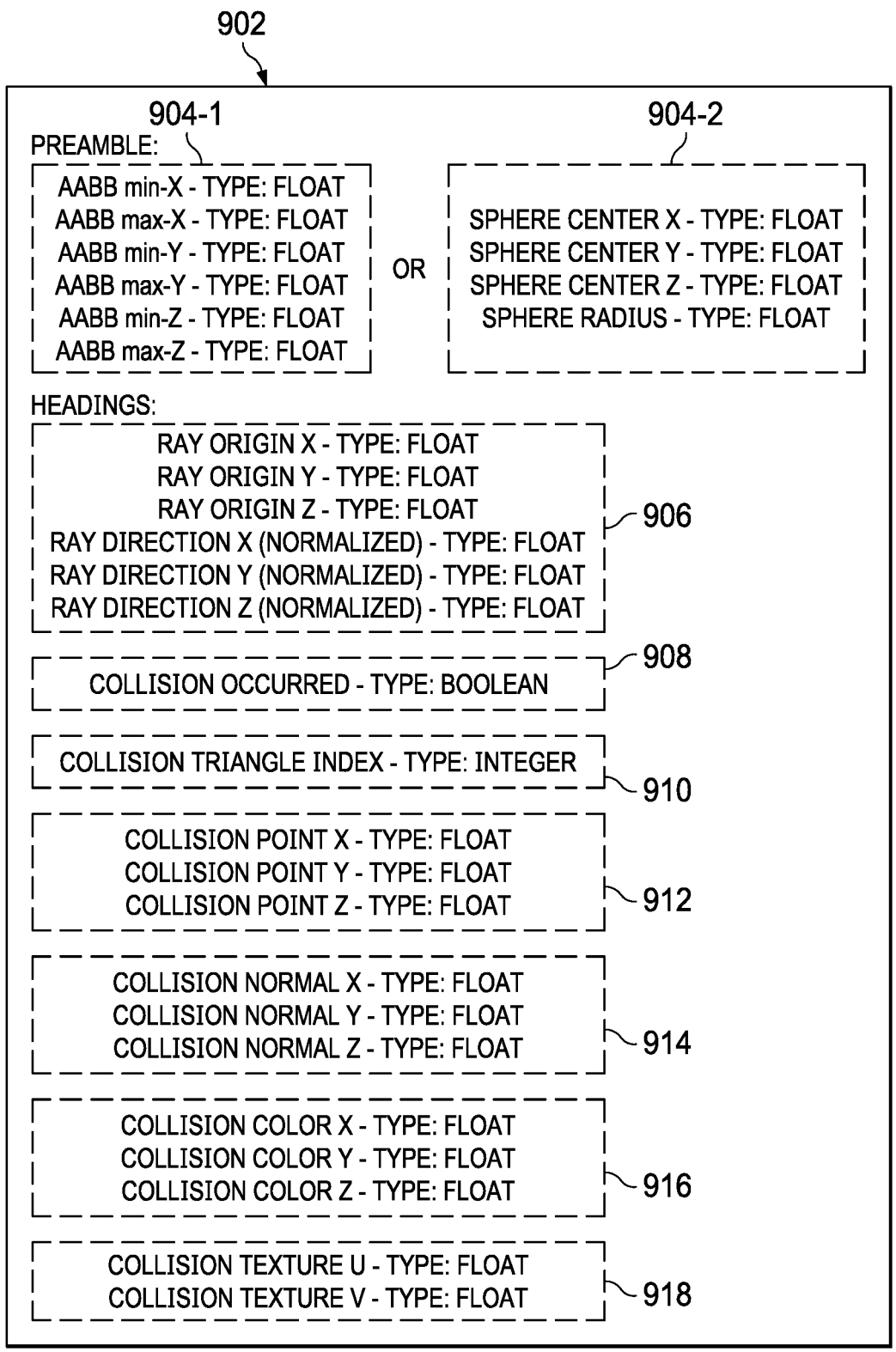
FIG. 9 is a diagram illustrating an example of a training data format for training machine learning models to detect object collisions in a virtual environment in accordance with some embodiments.

In at least some embodiment, the ray casting unit 124-1 stores attributes/parameter of the bounding volume 122-1 and the ray 114-1 as collision detection training data 118-1. For example, FIG. 9 shows one example of training data 902 associated with the object 112-1. In the example shown in FIG. 9, the data 902 includes attributes or parameters 904 (shown as 904-1 and 904-2) of the bounding volume 122-1 associated with the object 112-1. If the bounding volume 122-1 is an AABB, the recorded parameters 904-1 include, for example, the extents of the AABB such as the x, y, and z minimum coordinates, the x, y, and z maximum coordinates, and so on. If the bounding volume 122-1 is a bounding sphere, the recorded parameters 904-2 include, for example, the center x, y, and z coordinates, the radius of the sphere, and so on. It should be understood that the object rendering unit 120-1, in at least some embodiments, also records these parameters 904 of the bounding volume 122-1. FIG. 9 also shows that the collision detection training data 902 includes parameters 906 associated with the ray 114-1, such as the x, y, and z origin coordinates, the normalized x, y, and z direction coordinates, and so on.

Returning to FIG. 3, after the ray 114-1 has been cast, the collision detection unit 116-1, at block 310, determines whether the ray 114-1 intersects the object 112-1. The collision detection unit 116-1 stores data associated with this determination as part of the collision detection training data 118-1. In at least some embodiments, the collision detection unit 116 implements one or more ray-polygon intersection techniques. For example, a ray-triangle intersection technique, in at least some embodiments, is implemented by the collision detection unit 116 to determine whether the ray 114-1 intersects a triangle of the object's mesh. One example of a ray-triangle intersection technique is the Möller-Trumbore intersection algorithm.

In at least some embodiments, the data stored by the collision detection unit 116-1 as part of the collision detection training data 118-1 includes information such as whether an intersection (collision) occurred, a three-dimensional point of intersection, the intersection normal, tangent, color coordinates, UV coordinates, and so on. For example, FIG. 9 shows the training data 902 includes a collision occurrence indicator 908 to indicate that the ray 114-1 intersected the object 112-1 or did not intersect the object 112-1. If the ray 114-1 did intersect the object 112-1, parameters associated with the intersection are included in the training data 902. For example, the training data 902 includes the index 910 of the triangle that the ray 114-1 intersected; the location 912 (x, y, and z coordinates) on the triangle (or another polygon) where the intersection occurred; the x, y, and z coordinates of the intersection normal 914; the x, y, z color coordinates 916 at the intersection; the UV texture coordinates 918 at the intersection; and so on. Similar collision detection training data is generated for each ray 114-1 cast during the training data generation process.

Returning to FIG. 3, once collision detection has been performed for the cast ray 114-1, the ray casting unit 124-1, at block 312, determines if a threshold number of rays have been cast for the current object 112-1. In at least some embodiments, the threshold number of rays corresponds to the number of training samples desired for the current object 112-1. If the threshold number of rays has not been cast, the flow returns to block 308, where another ray 114-1 is cast. In at least some embodiments, multiple rays 114-1 are cast concurrently with each other, and the collision detection process is performed for these multiple rays 114-1 in parallel. If the threshold number of rays has been cast, the object rendering unit 120, at block 314, determines if collision detection training data 118-1 needs to be generated for any additional objects 112-1. If training data 118-1 has not been generated for all objects 112-1, the flow returns to block 302 and the next object 112-1 is rendered. It should be understood that multiple objects 112-1, in at least some embodiments, are concurrently rendered. In these embodiments, the flow returns to block 304. Also, in at least some embodiments, training data 118-1 is generated for multiple objects in parallel. If training data 118-1 has been generated for all objects 112-1, the flow ends at block 316.

Figure 4:
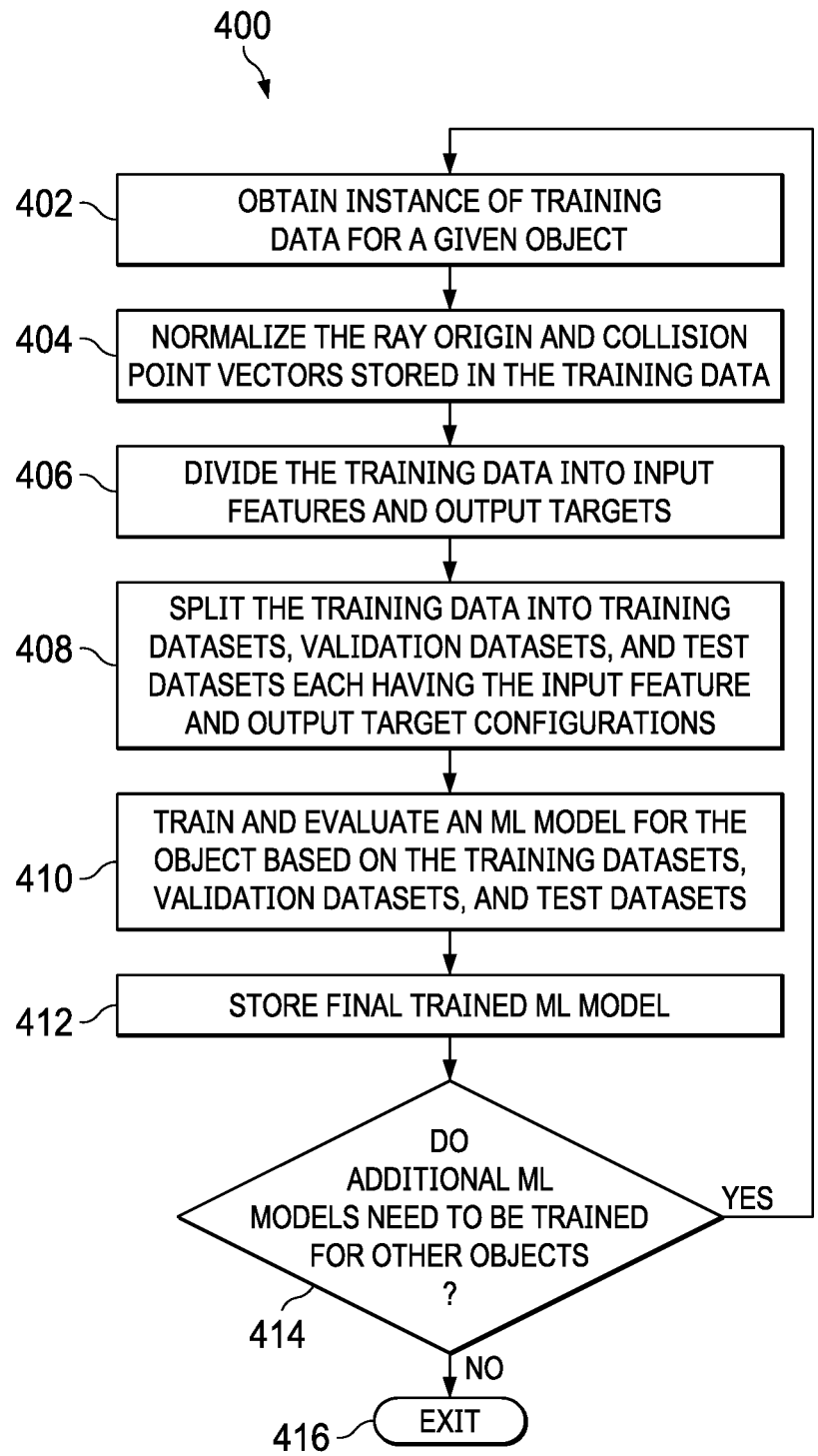
FIG. 4 is a flow diagram illustrating an example method for training machine learning models to detect object collisions in a virtual environment in accordance with some embodiments.

FIG. 4 illustrates, in flow chart form, one example of a more detailed method 400 for the ML model training process illustrated in block 204 of FIG. 2. The ML model training system 128, at block 402, obtains an instance of the training data 118-2 generated for a given object 112-1. The training system 128, at block 404, normalizes the ray origin and collision point vectors stored in the training data 118-2 using one or more of various techniques, such as logarithmic transformations, linear transformations, and so on. In an example where the training data 118-2 is generated using an AABB, the ray origin and collision point vectors are normalized, for example, to a unit cube using the AABB extents with a minimum extent of (0, 0, 0) and a maximum extent of (1, 1, 1). Alternatively, in at least some embodiments, the minimum extent is set to (−1, −1, −1) and the maximum extent is set to (1, 1, 1). This configuration is useful for alternative activation functions such as tanh. In an example where the training data 118 is generated using a bounding sphere, the ray origin and collision point vectors are normalized to a unit sphere with the bounding sphere's center set to (0, 0, 0) and radius set to 1.

The ML model training system 128, at block 406, divides the training data 118-2 into input features and output targets. In at least some embodiments, the input features for training an ML model 132-1 on ray-object collision detection include the ray origin x-coordinate, the ray origin y-coordinate, the ray origin z-coordinate, the ray direction x-coordinate, the ray direction y-coordinate, and the ray direction z-coordinate. The output targets, in at least some embodiments, include the collision indicator, the collision x-coordinate, the collision y-coordinate, the collision z-coordinate, the collision normal x-coordinate, the collision normal y-coordinate, the collision normal z-coordinate, the collision color x-coordinate, the collision color y-coordinate, the collision color z-coordinate, the collision texture u-coordinate, and the collision texture v-coordinate. It should be understood that embodiments are not limited to these input feature and output target configurations, and other configurations are applicable as well.

In at least one embodiment, the ML model training system 128, at block 408, splits the training data 118 into training datasets 134, validation datasets 136, and test datasets 138, each having the input feature and output target configurations (input-output pairs) described above. In other embodiments, the training data 118 is only split into training datasets 134 and test datasets 138. The training dataset 134 is used by the ML model training system 128 to initially fit the parameters, such as weights, of the model. For example, if the ML model 132-1 is a multilayer perceptron (MLP), the training datasets 136, in at least some embodiments, are used to determine the optimal weights using backpropagation. Once the ML model 132-1 has been fitted based on the training dataset 134, the ML model training system 128 uses the validation dataset 136 as input to the fitted model for fine-tuning the parameters. For example, if the ML model 132-1 is an MLP, the validation set is used to find the optimal number of hidden units or determine when backpropagation should be stopped. After fine-tuning of the ML model 132-1 has been performed using the validation dataset 136, the ML model training system 128 uses the test dataset 138 to evaluate the performance of the fully trained ML model 132-1. For example, if the ML model 132-1 is an MLP, test dataset 138 is used to estimate the error rate after the final MLP size and weights have been determined using the validation dataset 136.

The ML model training system 128, at block 410, then trains and evaluates the ML model 132-1 using the training datasets 134, validation datasets 136, and test datasets 138. In at least some embodiments, the ML model 132-1 is trained for detecting collisions between a cast ray 114 and a given object 112. However, in other embodiments, the ML model 132-1 is trained to detect collisions between other entities, such as object-to-object collisions. Classification training, in at least some embodiments, is performed to train the ML model 132-1 to detect the probability of a collision. Regression training, in at least some embodiments, is also performed to train the ML model 132-1 to assess properties of a detected collision, such as penetration. In an embodiment where the ML model 132-1 is trained to detect collisions between a cast ray 114 and an object 112, the ML model 132-1 is trained to output one or more collision output features, such as those described in the example given above, given input data comprising, for example, ray origin and direction information.

In at least some embodiments, one or more training techniques are used to train the ML models 132-1 depending on the ML model type being implemented. In at least some embodiments, the ML models 132-1 are deep learning neural network models configurable for accuracy and performance requirements. A neural network is generally comprised of a plurality of connected units or nodes referred to as artificial neurons. Each neuron, in at least some embodiments, transmits a signal to another neuron via a connection therebetween. A neuron that receives a signal from another neuron processes the signal and transmits its signal to another neuron based on the processed signal. A neuron is associated with a state (e.g., $0 \le x \le 1$) where both a neuron and a connection are associated with a weight that affects the strength of the signal transmitted to another neuron. The weight, in at least some embodiments, varies, during the learning process of the model. The model, in at least some embodiments, comprises multiple layers of connected neurons, where different layers perform different transformations on their inputs. The first layer acts as the initial input to the model, where signals from this layer propagate to the final layer.

Different types of neural network model, in at least some embodiments, are be implemented for the ML models 132. One example of an applicable neural network model is a multilayer perceptron (MLP), which is a feedforward artificial neural network. An MLP typically includes an input layer, one or more hidden layers, and an output layer that implements forward propagation. For example, the input layer is the first layer in the MLP and is connected to a hidden layer. The input layer receives input data and passes the input data to the connected hidden layer. Hidden layers are middle layers situated between the input layer and the output layer. Hidden layers apply mathematical operations on input data received from the previous connected layer, which is either the input layer or another hidden layer. The hidden layers then pass their resulting values to the next connected layer, which is either another hidden layer or the output layer. In a single hidden layer implementation, the hidden layer applies mathematical operations on input data received from the input layer and passes the resulting value to a connected output layer. In a multiple hidden layer implementation, the first hidden layer passes its resulting value to a connected second hidden layer. The output layer is the last layer and receives input from the last hidden layer. The output layer makes a decision or prediction regarding the input data based on the values received from the connected hidden layer.

In an embodiment where the ML model 132-1 is being trained to detect if a ray 114 collides with an object 112, the first layer of the ML model 132-1 receives input data associated with a cast ray 114, such as the x, y, and z origin coordinates of the ray and the x, y, and z direction coordinates of the ray. Each neuron in the first layer passes its received ray input data to one or more neurons in the hidden layer. Each neuron in the hidden layer applies mathematical operations on the ray input data received from one or more neurons in the input layer to obtain a calculated value. The neurons in the hidden layer then pass their calculated value to neurons either in the next hidden layer (if configured) or the output layer. Each neuron in the output layer applies mathematical operations on the calculated value received from one or more neurons in the last hidden layer to produce a final output value. The final output value(s) generated by the output layer indicates whether the ray 114 being processed by the ML model 132-1 collide with the object 112 represented by the ML model 132-1. The final output value(s) generated by the output layer, in at least some embodiments, also indicates characteristics of a detected collision, such as the x, y, and z coordinates of the collision, the collision normal x, y, and z coordinates, the collision color x, y, and z coordinates, the collision u and v texture coordinates, and so on.

Each connection between an input neuron and a hidden layer neuron, a hidden layer neuron and another hidden layer neuron, and a hidden layer neuron and an output layer neuron is associated with a weight. If a neuron has multiple input connections, each of these connections is associated with a separate weight. The weight is a value that represents the strength of the connection between the two neurons and is updated during training to decrease loss/error. In other words, the weight determines how much influence the input received by the neuron will have on the output generated by the neuron.

A neuron in the hidden and output layers typically operates by multiplying each input value received over a connection by the weight of the connection. After the weights have been applied to the input values, the weighted input values are summed to obtain a summed weighted input. A bias value, in at least some embodiments, is optionally added to the summed weighted input. The neuron then applies an activation function, such as a non-linear activation function, to the summed weighted input. The activation function defines the neuron's output and is responsible for transforming the summed weighted input into the neuron's activation for that input. Non-linear activation functions enable the model to generate complex mappings between the inputs and the outputs of the model. These complex mappings enable the network to learn and model complex data that is non-linear or has high dimensionality. The neurons' activation function in the hidden layers generates an output value that is passed to the next layer, which is either a subsequent hidden layer or the output layer. The activation function applied to the neurons in the output layer generates the model's final output value. In at least some embodiments, the neurons in the output layer are linear in regression and sigmoid in classification.

As part of the training process, the MLP implements a supervised learning technique referred to as backpropagation. Backpropagation involves changing a neuron's connection weights according to a learning rate after each input is processed. The connection weights are adjusted based on the amount of error in the output compared to the expected result. For example, suppose the final output value of the ML model 132-1 is a determination that a ray 114 collided with an object 112. In that case, this output value is compared with the actual output value of the training data 118 (e.g., a collision occurred or did not occur) to calculate an error value. In at least some embodiments, any loss function, such as mean square error (MSE), is implemented to calculate the error value. The derivative of the error value is then determined with respect to each weight in the ML model 132. In more detail, the error value derivatives are first calculated with respect to the weights in the output layer. These derivatives are also referred to as gradients. The gradients determined for the output layer are used to determine the gradients for the second to the last layer, which is the last hidden layer in the current example. This process is repeated until the gradients are determined for each weight in the ML model 132-1.

Once a gradient is determined for a weight, the gradient value is subtracted from the weight value, which reduces the error value. This process is repeated for each training iteration using, for example, the training data 134 and validation data 136 until convergence occurs (i.e., additional training does not improve the ML model 132-1). Once the final trained ML model 132-1 has been obtained, the ML model training system 128 utilizes the test dataset 138 to estimate the error rate after the final trained ML model 132-1. The final trained ML model 132, at block 412, is stored locally or on a remote system. In at least some embodiments, the trained ML model 132 is linked with the object 112-1 that it models. For example, the trained ML model 132 comprises or is otherwise associated with a unique ID of the object 112-1. Alternatively, the object 112-1, in at least some embodiments, comprise or are otherwise associated with a unique ID of the trained ML model 132. After the final trained ML model 132 has been obtained for the current object 112-1, the ML model training system 128, at block 414, determines if any additional ML models 132-1 need to be trained for other objects 112-1. If an ML model 132-1 needs to be trained for an additional object 112-1, the flow returns to block 402. If an ML model 132 has been trained for all objects 112-1, the flow exits at block 416.

In at least some embodiments, the final trained ML model 132-1 is a neural network model trained to input rays 114 along a bounding volume 122 of an object 112 and return collision data 146. Therefore, in at least these embodiments, the trained ML model 132-1 approximates a function that returns collision data 146 given an input ray 114 as seen from a collision volume. If the collision data 146 is generated from a mesh/ray intersection, the function approximates this mesh/ray intersection. In the absence of the mesh for mesh/ray intersection, an approximation of the object's shape is reconstructed, for example, by casting rays 114 and using the computation of the ML model 132-1 to generate collision data 146. This collision data 146, in at least some embodiments, is used to reconstruct points on the object's mesh. It could also be used in lighting calculations, physics calculations, silhouette computation, and similar methods that mesh/ray intersection is traditionally used for. As such, this approach provides an acceleration structure (i.e., the ML model 132) that, in at least some embodiments, is used in place of a BVH for mesh/ray intersection or at least as a more accurate collision volume for excluding rays before doing a more expensive operation, such as BVH traversal.

Figure 5:
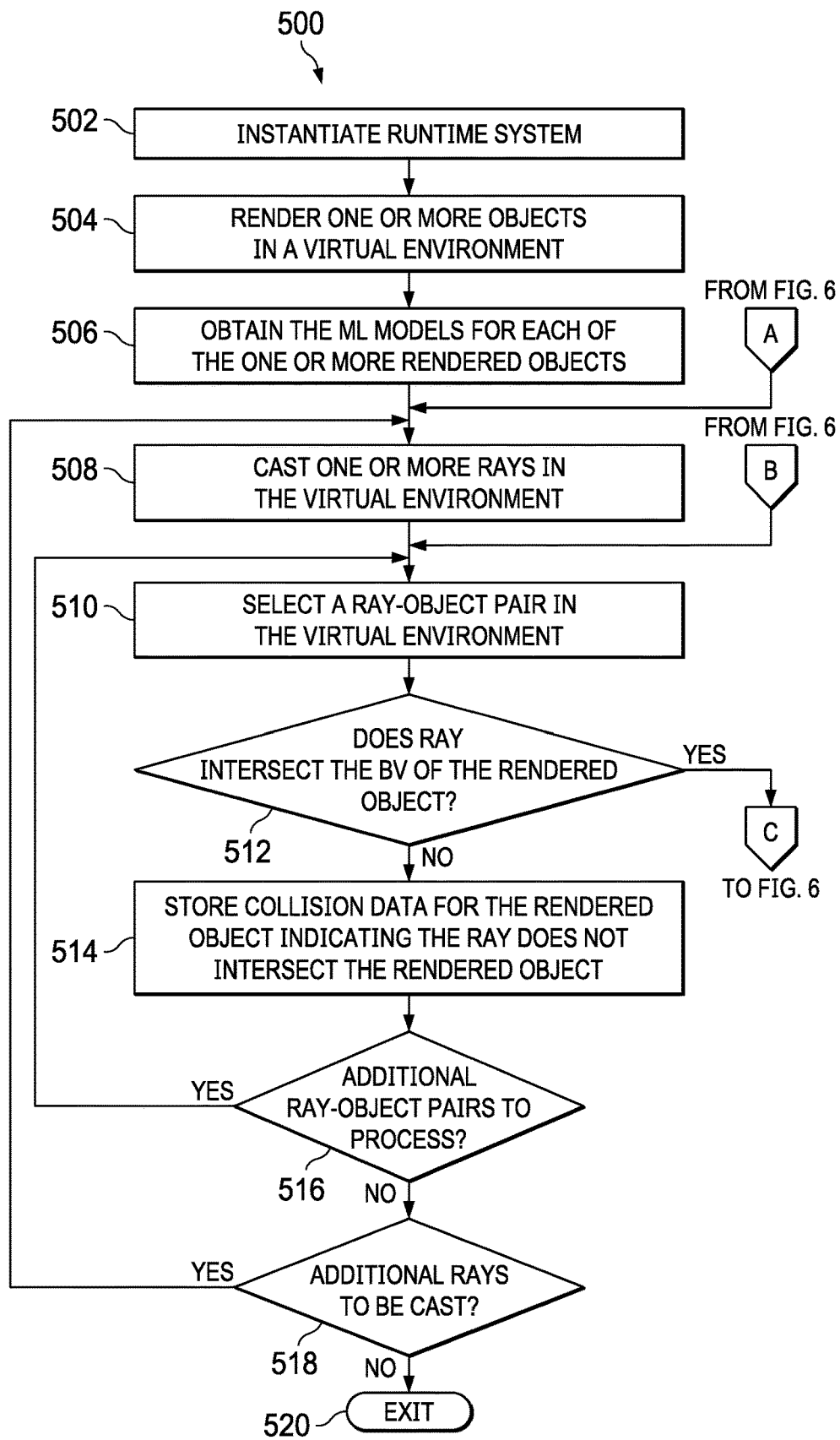
FIGS. 5 and 6 are a flow diagram illustrating an example method for detecting object collisions in a virtual environment using trained machine learning models in accordance with some embodiments.
Figure 6:
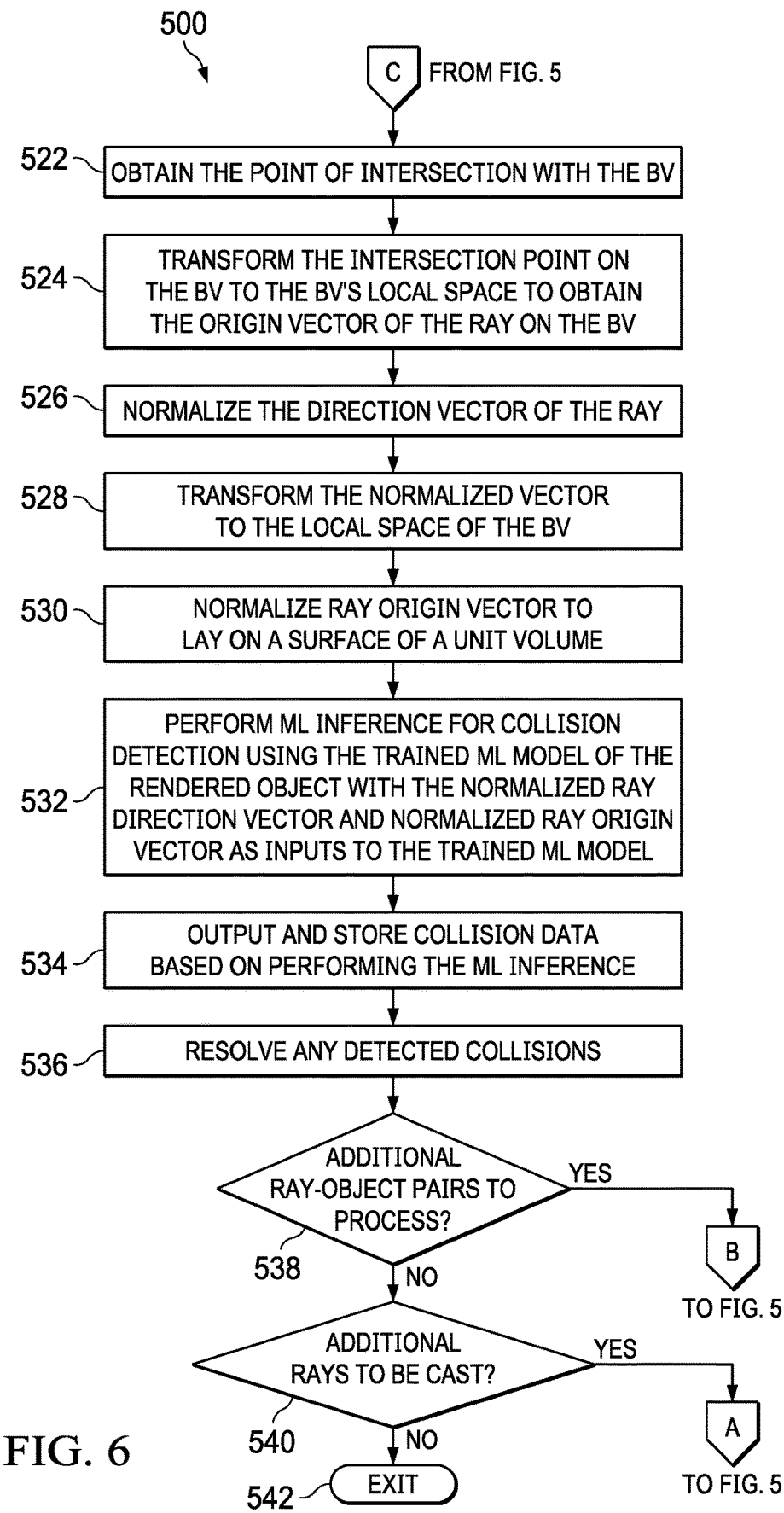

FIGS. 5 and 6 together illustrate, in flow chart form, one example of a more detailed method 500 for the ML collision detection process illustrated in block 206 of FIG. 2. As described above, the trained ML models 132-2, in at least some embodiments, is implemented in a runtime system/environment 140 such as a video game, simulation, or any other type of environment where collision detection is implemented. The runtime system 140, at block 502, is instantiated. The object rendering unit 120-2, at block 504, renders one or more objects 112-2 in a virtual environment 142. For example, if the runtime system 140 is a video game, one or more objects 112-2 (e.g., avatar, vehicle, etc.) are rendered in the current scene of the virtual environment 142. In at least some embodiments, the object rendering unit 120-2 (or another component of the runtime system 140), at block 506, loads the trained ML models 132-2 for each of the rendered objects 112-2. However, in at least some embodiments, the ML models 132-2 are loaded or obtained at other points in the flow. For example, the trained ML models 132-2, in at least some embodiments, are obtained on a per-object basis, such as when collision detection is being performed for a given object 112-2. In another example, one or more trained ML models 132-2 are loaded/obtained upon instantiation of the runtime system 140. In at least some embodiments, the ML models 132-2 are loaded with their corresponding bounding volume and architecture/parameters/weights as a special ML shape. As such, the ML models 132-2 represent the modeled object as opposed to a mesh representing the object.

The ray casting unit 124-2, at block 508, casts one or more rays 114-2 in the virtual environment 142 from a ray casting source, such as a light source, in world space. The collision detection unit 116-2, at block 510, selects a ray-object pair associated with the virtual environment 142. A ray-object pair comprises a ray 114-2 that has been cast and an object 112-2 that has been rendered in the virtual environment 142. Two or more ray-object pairs, in at least some embodiments, include different rays 114-2 and different objects 112-2, different rays 114-2 and the same object 112-2, or the same ray 114-2 and different objects 112-2.

The collision detection unit 116-2, at block 512, if the ray 114-2 of the ray-object pair has intersected the bounding volume 122-2 of the object 112-2 using one or more ray-volume intersection techniques. In at least some embodiments, this process is performed in parallel for multiple ray-object pairs in the virtual environment 142. The collision detection unit 116-2, in at least some embodiments, obtains parameters 148 associated with the ray 114-2, such as the ray-source origin x, y, and z coordinates and the x, y, and z direction coordinates of the ray 114-2. One or more of these ray parameters 148, in at least some embodiments, are predetermined or generated upon casting the ray 114-2. The ray parameters 148, in at least some embodiments, are obtained from local or remote storage, the ray casting unit 124-2, and so on. The collision detection unit 116-2 also obtains parameters 150 of the bounding volume 122-2 for the object 112-2, such as the minimum x, y, and z coordinates of the bounding volume 122-2 and the maximum x, y, and z coordinates of the bounding volume 122-2. The bounding volume parameters 150, in at least some embodiments, are obtained from local or remote storage, the trained ML model 132-2 associated with the corresponding rendered object 112-2, the object rendering unit 120-2, and so on.

The collision detection unit 116-2 uses, for example, the obtained ray parameters 148 and bounding volume parameters 150 to determine if and where the ray 114-2 intersects the bounding volume 122-2 of the object 112-2. In one example, given these parameters, the collision detection unit 116-2 performs a t-value test. In a t-value test, the t-value constant is multiplied by the ray's direction vector and then added to the ray's origin. The resulting value is a point in 3D space along the ray. By determining the values of t for the near and far x, y, and z planes of the bounding volume 122-2, the collision detection unit 116-2 determines if those t-values intersect the planes of the bounding volume 122-2 at two points that are within the range of bounding volume's bounds. It should be understood that other techniques for determining if the ray 114-2 intersects the bounding volume 122-2 of the object 112-2 are applicable as well.

If the collision detection unit 116-2 determines the ray 114-2 intersects the bounding volume 122-2 of the object 112-2, the control flow to block 522 of FIG. 6. In another embodiment, instead of proceeding to block 522 on a per-ray basis, all rays 114-2 that have been cast are processed to determine if they intersect a bounding volume 122-2. All rays 114-2 that intersect a bounding volume 122-2 be stored in a queue along with a unique ID of the object 112-2. Then, once all rays 114-2 have been processed, the control flows to block 522 of FIG. 6. If a determination is made at block 512 that the ray 114-2 does not intersect the bounding volume 122-2, the collision detection unit 116-2, at block 514, stores collision data 146 for the rendered object 112-2 indicating the ray 114-2 does not interest the object. The collision detection unit 116-2, at block 516, determines if any additional ray-object pairs need to be processed. If so, the flow returns to block 510, where the collision detection unit 116-2 selects a new ray-object pair for processing. If additional ray-object pairs do not need to be processed, the collision detection unit 116-2, at block 518, determines if additional rays are to be cast. If so, the flow returns to block 508. If additional rays are not to be cast, the flow exits at block 520.

The collision detection unit 116-2, at block 522, obtains the intersection point on the bounding volume 122-2, which was determined in block 512 for the current ray-object pair. In another embodiment, if rays 114-2 have been stored in a queue, the collision detection unit 116-2 obtains the intersection point for each of the stored rays 114-2. The intersection point, in at least some embodiments, is represented as a vector $\vec{p_w}$, where p represents the point and w indicates the point is in world space. The transformation unit 126-2, at block 524, transforms the intersection point $\vec{p_w}$ from world space to the local space of the bounding volume 122-2 such that $\vec{p_l} = M_{wl} \cdot \vec{p_w}$, where l is local space, $\vec{p_l}$ is the intersection point in local space, and $M_{wl}$ is a 4×4 homogenous transform from world space w to local space l. The vector $\vec{p_l}$ represents the origin point of the ray 114-2 on the bounding volume 122-2. The transformation unit 126-2, at block 526, normalizes the direction vector r of the ray 114-2, which is from the ray-source origin to the intersection point on the bounding volume 122-2, to a unit vector. The normalized vector, in at least some embodiments, is denoted as $\hat{r}_w$. In at least some embodiments, the ray direction vector r is recorded as a ray parameter 148 when the ray 114-2 is cast.

The transformation unit 126-2, at block 528, transforms the normalized ray direction vector $\hat{r}_w$ to the local space of the bounding volume 122-2 such that $\hat{r}_l = R^{-1} \cdot \hat{r}_w$, where $\hat{r}_l$ is the normalized direction vector $\hat{r}$ transformed to the local space l and $R^{-1}$ represents the rotation of the ray 114-2 from world space to local space. The transformation unit 126-2, at block 530, normalizes the ray origin vector $\vec{p_l}$ to lay on a surface of a unit volume. In one example, the ray origin vector $\vec{p_l}$ is normalized to lay on a unit cube with extents (0, 0, 0) and (1, 1, 1) using the extents of the bounding volume (e.g., an AABB) such that $$\|\vec{p_l}\| = \frac{\vec{p_l} - \vec{AABB_{min}}}{\vec{AABB_{max}} - \vec{AABB_{min}}},$$

where $\|\vec{p_l}\|$ is the magnitude of the ray origin vector, $\vec{p_l}$ is the ray origin vector on the bounding volume 122-2, $\vec{AABB_{min}}$ is a vector representing the minimum extents of the bounding volume 122-2, and $\vec{AABB_{max}}$ is a vector representing the maximum extents of the bounding volume 122-2. In another example, the ray origin vector $\vec{p_l}$ is normalized to lay on a unit sphere centered at (0,0,0) using radius r and center $\vec{c}$ such that $$\|\vec{p_l}\| = \frac{1}{r}(\vec{p_l} - \vec{c}).$$

The result or the operations performed at blocks 528 and 530 are a normalized ray direction vector $\hat{r}_l$ in local space and a normalized ray origin vector $\|\vec{p_l}\|$ laying on the bounding volume 122-2.

The collision detection unit 116-2, at block 532, performs ML inference for collision detection using the trained ML model 132-2 obtained for the object 112-2. In at least some embodiments, the trained ML model 132-2 is loaded at this point in the flow if the trained ML model 132-2 has not been previously loaded. The normalized ray direction vector $\hat{r}_l$ and the normalized ray origin vector $\|\vec{p_l}\|$ of the ray 114-2 are used as inputs for trained ML model 132-2. The collision detection unit 116-2, at block 534, stores collision data 146 generated trained ML model 132-2 during the ML inference process. Examples of collision data 146 include an indication of whether the ray 114-2 intersected the object 112-2, the collision point on the object 112-1 such as the collision point on a portion of the mesh approximated by the trained ML model 132-2, the collision normal vector, the color coordinates at the collision point, the UV coordinates at the collision point, the penetration depth of the ray, and so on. In at least some embodiments, if output features such as colors, normal, tangents, and so on are not required for a particular application, the collision detection unit 116-2 deactivates these features of the trained ML model 132-2 to reduce computation overhead. In at least one embodiment, if a collision is detected, the collision detection unit 116-2 de-normalizes the collision point back to the object scale in local space using a unit volume to world transform.

The collision resolution unit 144, at block 536, resolves a detected collision based on the collision data 146. The collision resolution unit generates data based on the collision data 146 utilized by the object rending unit 120-2 to render the object 112-2 based on the detected collision. For example, the collision resolution unit 144, in at least some embodiments, generates data utilized by the object rending unit 120-2 to adjust properties of the object 112-2 relating to shadowing, emissiveness, specularity, roughness, metallicness, and other properties of the object 112-2. The collision detection unit 116-2, at block 538, determines if any additional ray-object pairs need to be processed. If so, the flow returns to block 510 of FIG. 5, where the collision detection unit 116-2 selects a new ray-object pair for processing. If additional ray-object pairs do not need to be processed, the collision detection unit 116-2, at block 540, determines if additional rays 114-2 are to be cast. If so, the flow returns to block 508. If additional rays are not to be cast, the flow exits at block 542. In at least some embodiments, the operations described above with respect to blocks 522 to block 542 are performed in parallel for multiple ray-object pairs.

Figure 10:
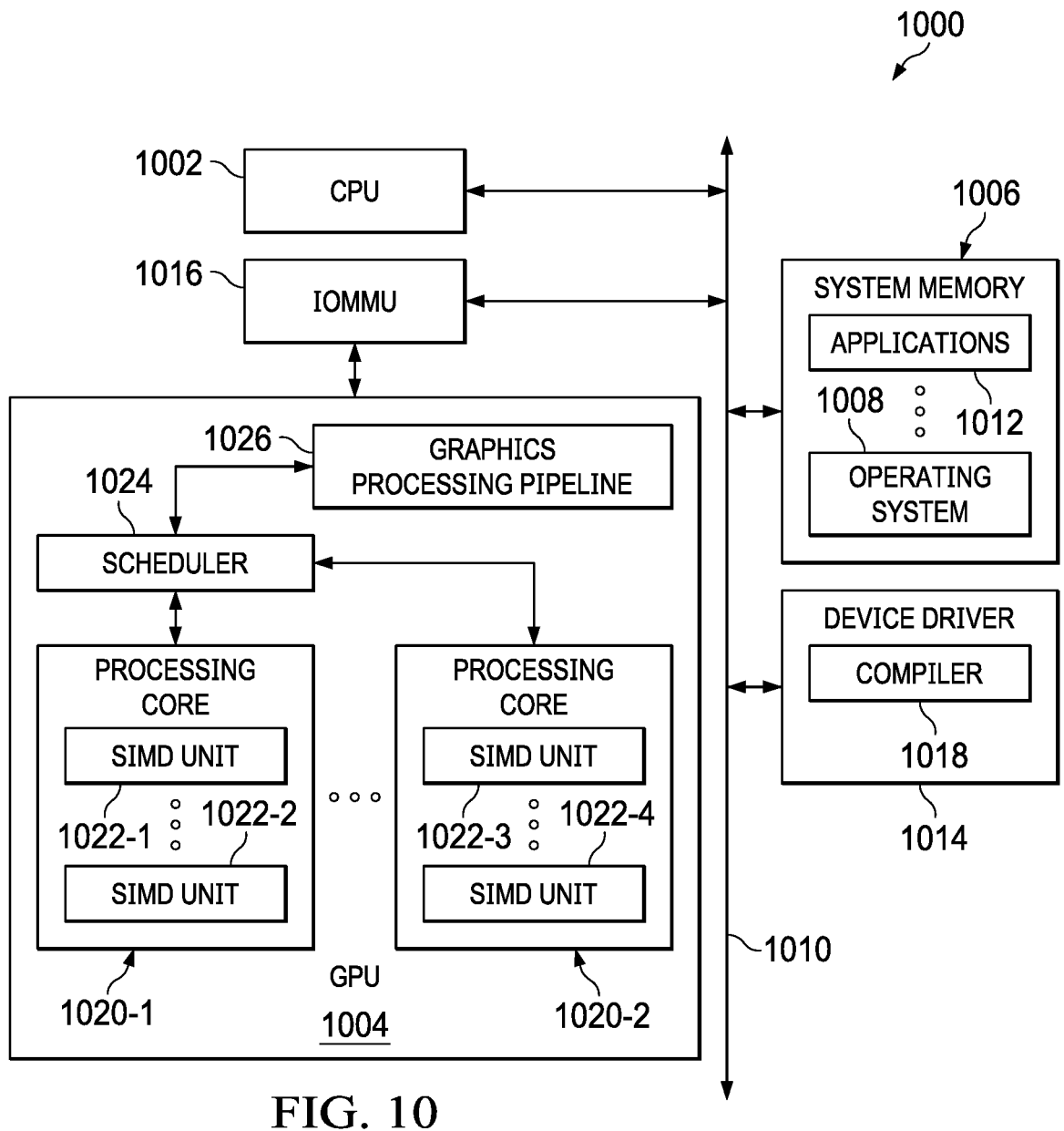
FIG. 10 is a block diagram of a processing system in accordance with some embodiments.

The techniques described herein are, in different embodiments, employed at any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). Referring now to FIG. 10, a block diagram of a processing system 1000, such as systems 102-1 to 102-3 or user device 104, is illustrated in accordance with some embodiments, configured with parallel processors. The processing system 1000 includes a central processing unit (CPU) 1002 and a graphics processing unit (GPU) 1004. In at least some embodiment, the CPU 1002, the GPU 1004, or both the CPU 1002 and GPU 1004 are configured to implement the trained ML models 132 for performing ML-based collision detection of objects 112 in a virtual environments 142. The CPU 1002, in at least some embodiments, includes one or more single- or multi-core CPUs. In various embodiments, the GPU 1004 includes any cooperating collection of hardware and or software that perform functions and computations associated with accelerating graphics processing tasks, data-parallel tasks, nested data-parallel tasks in an accelerated manner with respect to resources such as conventional CPUs, conventional graphics processing units (GPUs), and combinations thereof.

In the embodiment of FIG. 10, the CPU 1002 and the GPU 1004 are formed and combined on a single silicon die or package to provide a unified programming and execution environment. This environment enables the GPU 1004 to be used as fluidly as the CPU 1002 for some programming tasks. In other embodiments, the CPU 1002 and the GPU 1004 are formed separately and mounted on the same or different substrates. It should be appreciated that processing system 1000, in at least some embodiments, includes more or fewer components than illustrated in FIG. 10. For example, the processing system 1000, in at least some embodiments, additionally includes one or more input interfaces, non-volatile storage, one or more output interfaces, network interfaces, and one or more displays or display interfaces.

As illustrated in FIG. 10, the processing system 1000 also includes a system memory 1006, an operating system 1008, a communications infrastructure 1010, and one or more applications 1012. Access to system memory 1006 is managed by a memory controller (not shown) coupled to system memory 1006. For example, requests from the CPU 1002 or other devices for reading from or for writing to system memory 1006 are managed by the memory controller. In some embodiments, the one or more applications 1012 include various programs or commands to perform computations that are also executed at the CPU 1002. The CPU 1002 sends selected commands for processing at the GPU 1004. The operating system 1008 and the communications infrastructure 1010 are discussed in greater detail below. The processing system 1000 further includes a device driver 1014 and a memory management unit, such as an input/output memory management unit (IOMMU) 1016. Components of processing system 1000 are implemented as hardware, firmware, software, or any combination thereof. In some embodiments, the processing system 1000 includes one or more software, hardware, and firmware components in addition to or different from those shown in FIG. 10.

Within the processing system 1000, the system memory 1006 includes non-persistent memory, such as DRAM (not shown). In various embodiments, the system memory 1006 stores processing logic instructions, constant values, variable values during execution of portions of applications or other processing logic, or other desired information. For example, in various embodiments, parts of control logic to perform one or more operations on CPU 1002 reside within system memory 1006 during execution of the respective portions of the operation by CPU 1002. During execution, respective applications, operating system functions, processing logic commands, and system software reside in system memory 1006. Control logic commands that are fundamental to operating system 1008 generally reside in system memory 1006 during execution. In some embodiments, other software commands (e.g., a set of instructions or commands used to implement a device driver 1014) also reside in system memory 1006 during execution of processing system 1000.

The IOMMU 1016 is a multi-context memory management unit. As used herein, context is considered the environment within which the kernels execute and the domain in which synchronization and memory management is defined. The context includes a set of devices, the memory accessible to those devices, the corresponding memory properties, and one or more command-queues used to schedule execution of a kernel(s) or operations on memory objects. The IOMMU 1016 includes logic to perform virtual to physical address translation for memory page access for devices, such as the GPU 1004. In some embodiments, the IOMMU 1016 also includes, or has access to, a translation lookaside buffer (TLB) (not shown). The TLB is implemented in a content addressable memory (CAM) to accelerate translation of logical (i.e., virtual) memory addresses to physical memory addresses for requests made by the GPU 1004 for data in system memory 1006.

In various embodiments, the communications infrastructure 1010 interconnects the components of the processing system 1000. Communications infrastructure 1010 includes (not shown) one or more of a peripheral component interconnect (PCI) bus, extended PCI (PCI-E) bus, advanced microcontroller bus architecture (AMBA) bus, advanced graphics port (AGP), or other such communication infrastructure and interconnects. In some embodiments, communications infrastructure 1010 also includes an Ethernet network or any other suitable physical communications infrastructure that satisfies an application's data transfer rate requirements. Communications infrastructure 1010 also includes the functionality to interconnect components, including components of the processing system 1000.

A driver, such as device driver 1014, communicates with a device (e.g., GPU 1004) through an interconnect or the communications infrastructure 1010. When a calling program invokes a routine in the device driver 1014, the device driver 1014 issues commands to the device. Once the device sends data back to the device driver 1014, the device driver 1014 invokes routines in an original calling program. In general, device drivers are hardware-dependent and operating-system-specific to provide interrupt handling required for any necessary asynchronous time-dependent hardware interface. In some embodiments, a compiler 1018 is embedded within device driver 1014. The compiler 1018 compiles source code into program instructions as needed for execution by the processing system 1000. During such compilation, the compiler 1018 applies transforms to program instructions at various phases of compilation. In other embodiments, the compiler 1018 is a standalone application. In various embodiments, the device driver 1014 controls operation of the GPU 1004 by, for example, providing an application programming interface (API) to software (e.g., applications 1012) executing at the CPU 1002 to access various functionality of the GPU 1004.

The CPU 1002 includes (not shown) one or more of a control processor, field-programmable gate array (FPGA), application-specific integrated circuit (ASIC), or digital signal processor (DSP). The CPU 1002 executes at least a portion of the control logic that controls the operation of the processing system 1000. For example, in various embodiments, the CPU 1002 executes the operating system 1008, the one or more applications 1012, and the device driver 1014. In some embodiments, the CPU 1002 initiates and controls the execution of the one or more applications 1012 by distributing the processing associated with one or more applications 1012 across the CPU 1002 and other processing resources, such as the GPU 1004.

The GPU 1004 executes commands and programs for selected functions, such as graphics operations and other operations that are particularly suited for parallel processing. In general, GPU 1004 is frequently used for executing graphics pipeline operations, such as pixel operations, geometric computations, and rendering an image to a display. In some embodiments, GPU 1004 also executes compute processing operations (e.g., those operations unrelated to graphics such as video operations, physics simulations, computational fluid dynamics, etc.), based on commands or instructions received from the CPU 1002. For example, such commands include special instructions that are not typically defined in the instruction set architecture (ISA) of the GPU 1004. In some embodiments, the GPU 1004 receives an image geometry representing a graphics image, along with one or more commands or instructions for rendering and displaying the image. In various embodiments, the image geometry corresponds to a representation of a two-dimensional (2D) or three-dimensional (3D) computerized graphics image.

In various embodiments, the GPU 1004 includes one or more compute units, such as one or more processing cores 1020 (illustrated as 1020-1 and 1020-2) that include one or more single-instruction multiple-data (SIMD) units 1022 (illustrated as 1022-1 to 1022-4) that are each configured to execute a thread concurrently with execution of other threads in a wavefront by other SIMD units 1022, e.g., according to a SIMD execution model. The SIMD execution model is one in which multiple processing elements share a single program control flow unit and program counter and thus execute the same program but are able to execute that program with different data. The processing cores 1020 are also referred to as shader cores or streaming multi-processors (SMXs). The number of processing cores 1020 implemented in the GPU 1004 is configurable. Each processing core 1020 includes one or more processing elements such as scalar and or vector floating-point units, arithmetic and logic units (ALUs), and the like. In various embodiments, the processing cores 1020 also include special-purpose processing units (not shown), such as inverse-square root units and sine/cosine units.

Each of the one or more processing cores 1020 executes a respective instantiation of a particular work item to process incoming data, where the basic unit of execution in the one or more processing cores 1020 is a work item (e.g., a thread). Each work item represents a single instantiation of, for example, a collection of parallel executions of a kernel invoked on a device by a command that is to be executed in parallel. A work item executes at one or more processing elements as part of a workgroup executing at a processing core 1020.

The GPU 1004 issues and executes work-items, such as groups of threads executed simultaneously as a "wavefront", on a single SIMD unit 1022. Wavefronts, in at least some embodiments, are interchangeably referred to as warps, vectors, or threads. In some embodiments, wavefronts include instances of parallel execution of a shader program, where each wavefront includes multiple work items that execute simultaneously on a single SIMD unit 1022 in line with the SIMD paradigm (e.g., one instruction control unit executing the same stream of instructions with multiple data). A scheduler 1024 is configured to perform operations related to scheduling various wavefronts on different processing cores 1020 and SIMD units 1022 and performing other operations to orchestrate various tasks on the GPU 1004.

To reduce latency associated with off-chip memory access, various GPU architectures include a memory cache hierarchy (not shown) including, for example, L1 cache and a local data share (LDS). The LDS is a high-speed, low-latency memory private to each processing core 1020. In some embodiments, the LDS is a full gather/scatter model so that a workgroup writes anywhere in an allocated space.

The parallelism afforded by the one or more processing cores 1020 is suitable for graphics-related operations such as pixel value calculations, vertex transformations, tessellation, geometry shading operations, and other graphics operations. A graphics processing pipeline 1026 accepts graphics processing commands from the CPU 1002 and thus provides computation tasks to the one or more processing cores 1020 for execution in parallel. Some graphics pipeline operations, such as pixel processing and other parallel computation operations, require that the same command stream or compute kernel be performed on streams or collections of input data elements. Respective instantiations of the same compute kernel are executed concurrently on multiple SIMD units 1022 in the one or more processing cores 1020 to process such data elements in parallel. As referred to herein, for example, a compute kernel is a function containing instructions declared in a program and executed on an accelerated processing device (APD) processing core 1020. This function is also referred to as a kernel, a shader, a shader program, or a program.

In at least some embodiments, the processing system 1000 is a computer, laptop/notebook, mobile device, gaming device, wearable computing device, server, or any of various other types of computing systems or devices. It is noted that the number of components of the processing system 1000 varies from embodiment to embodiment. In at least some embodiments, there is more or fewer of each component/subcomponent than the number shown in FIG. 10. It is also noted that the processing system 1000, in at least some embodiments, includes other components not shown in FIG. 10. Additionally, in other embodiments, the processing system 1000 is structured in other ways than shown in FIG. 10.

In some embodiments, the apparatus and techniques described above are implemented in a system including one or more integrated circuit (IC) devices (also referred to as integrated circuit packages or microchips). Electronic design automation (EDA) and computer-aided design (CAD) software tools, in at least some embodiments, are used in the design of the standard cells and the design and fabrication of IC devices implementing the standard cells. These design tools typically are represented as one or more software programs. The one or more software programs include code executable by a computer system to manipulate the computer system to operate on code representative of circuitry of one or more IC devices to perform at least a portion of a process to design or adapt a manufacturing system to fabricate the circuitry. This code, in at least some embodiments, includes instructions, data, or a combination of instructions and data. The software instructions representing a design tool or fabrication tool typically are stored in a computer-readable storage medium accessible to the computing system. Likewise, the code representative of one or more phases of the design or fabrication of an IC device, in at least some embodiments, is stored in and accessed from the same computer-readable storage medium or a different computer-readable storage medium.

A computer-readable storage medium, in at least some embodiments, includes include any non-transitory storage medium or combination of non-transitory storage media accessible by a computer system during use to provide instructions and or data to the computer system. Such storage media, in at least some embodiments, includes, but is not limited to, optical media (e.g., compact disc (CD), digital versatile disc (DVD), Blu-ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer-readable storage medium, in at least some embodiments, is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer-readable storage medium. The software, in at least some embodiments, includes the instructions and certain data that, when executed by the one or more processors, manipulate the one or more processors to perform one or more aspects of the techniques described above. The non-transitory computer-readable storage medium, in at least some embodiments, includes, for example, a magnetic or optical disk storage device, solid-state storage devices such as Flash memory, a cache, random access memory (RAM), or other non-volatile memory device or devices, and the like. The executable instructions stored on the non-transitory computer-readable storage medium, in at least some embodiments, is in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed is not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified, and all such variations are considered within the scope of the disclosed subject matter. Accordingly, the protection sought herein is as set forth in the claims below.

What is claimed is:

1. A method comprising:
   processing, using a machine learning model, one or more parameters associated with a ray cast in virtual environment comprising an object, the machine learning model configured to generate an approximated mesh representing the object based on geometric surface data associated with the object;
   generating a proximity score for potential intersections, using the machine learning model, by calculating distances between the ray and relevant portions of the approximated mesh, wherein a collision is indicated when the proximity score satisfies a threshold indicating an intersection with the approximated mesh;
   responsive to a collision between the ray and the object as indicated by the proximity score, generating, using the machine learning model, collision data associated with the ray and the object; and
   updating, based on the collision data, at least one of the object or the virtual environment to indicate the collision occurred.

2. The method of claim 1, further comprising:
   selecting the machine learning model from a plurality of machine learning models based on the object, wherein different machine learning models are associated with different objects.

3. The method of claim 1, wherein updating the at least one of the object or the virtual environment comprises:
   rendering the object in the virtual environment based on the collision data generated using the machine learning model.

4. The method of claim 1, further comprising:
   obtaining the one or more parameters associated with the ray as input to the machine learning model in response to:
   determining the ray intersects a bounding volume of the object based on an origin point of the ray, a direction vector of the ray, and extent values of the bounding volume.

5. The method of claim 4, further comprising:
   determining a point on the bounding volume intersected by the ray;
   transforming the point from world-space coordinates to local-space coordinates of the bounding volume to generate a local-space intersection point;
   normalizing the local-space intersection point to lay on a surface of a unit volume to generate a normalized origin point for the ray on the bounding volume of the object; and
   selecting the normalized origin point as one of the one or more parameters of the ray.

6. The method of claim 5, further comprises:
   normalizing the direction vector of the ray to the point on the bounding volume intersected by the ray;
   transforming the direction vector from world-space coordinates to local-space coordinates of the bounding volume to generate a normalized local-space direction vector for the ray; and
   selecting the normalized local-space direction vector as one of the one or more parameters of the ray.

7. The method of claim 1, wherein the machine learning model is a trained based on casting rays from a point on or within a bounding volume of the object.

8. The method of claim 1, wherein the collision data comprises:
   an indication whether the ray collides with the object, and
   if a collision occurred between the ray and the object, the collision data further comprises information associated with collision, the information comprising at least one of:
   a location on the object where the ray intersects;

a normal vector associated with the collision;
color coordinates of the location on the object where the ray intersects; or
texture coordinates of the location on the object where the ray intersects.

9. An apparatus comprising:
a processor; and
a collision detection unit operatively coupled to the processor, the collision detection unit being configured to:
process, using a machine learning model, one or more parameters associated with a ray cast in virtual environment comprising an object, the machine learning model configured to generate an approximated mesh representing the object based on geometric surface data associated with the object;
generate, using the machine learning model, a proximity score for potential intersections by calculating distances between the ray and relevant portions of the approximated mesh, wherein a collision is indicated when the proximity score satisfies a threshold indicating an intersection with the approximated mesh; and
responsive to a collision between the ray and the object, generate, using the machine learning model, collision data associated with the ray and the object,
the processor configured to update, based on the collision data, at least one of the object or the virtual environment to indicate the collision occurred.

10. The apparatus of claim 9, wherein the collision detection unit is configured to:
select the machine learning model from a plurality of machine learning models based on the object, wherein different machine learning models are associated with different objects.

11. The apparatus of claim 9, further comprising:
a collision resolution unit configured to resolve a collision between the ray and the object, by rendering the object in the virtual environment based on the collision data generated using the machine learning model.

12. The apparatus of claim 11, wherein the collision detection unit is configured to:
obtain the one or more parameters associated with the ray as input to the machine learning model in response to:
determining the ray intersects a bounding volume of the object based on an origin point of the ray, a direction vector of the ray, and extent values of the bounding volume.

13. The apparatus of claim 12, wherein collision detection unit is further configured to:
determine a point on the bounding volume intersected by the ray;
transform the point from world-space coordinates to local-space coordinates of the bounding volume to generate a local-space intersection point;
normalize the local-space intersection point to lay on a surface of a unit volume to generate a normalized origin point for the ray on the bounding volume of the object; and
select the normalized origin point as one of the one or more parameters of the ray.

14. The apparatus of claim 13, wherein collision detection unit is further configured to:
normalize the direction vector of the ray to the point on the bounding volume intersected by the ray;
transform the direction vector from world-space coordinates to local-space coordinates of the bounding volume to generate a normalized local-space direction vector for the ray; and
select the normalized local-space direction vector as one of the one or more parameters of the ray.

15. The apparatus of claim 9, wherein the machine learning model is a trained based on casting rays from a point on or within a bounding volume of the object.

16. The apparatus of claim 9, wherein the collision data comprises:
an indication whether the ray collides with the object, and
if a collision occurred between the ray and the object, the collision data further comprises information associated with collision, the information comprising at least one of:
a location on the object where the ray intersects;
a normal vector associated with the collision;
color coordinates of the location on the object where the ray intersects; or
texture coordinates of the location on the object where the ray intersects.

17. A method comprising:
casting a ray within a virtual environment comprising an object;
determining a local-space intersection point of the ray on a bounding volume of the object;
setting the local-space intersection point as an origin point of the ray;
determining a direction vector of the ray based on the local-space intersection point;
providing the origin point and the direction vector of the ray to a machine learning model trained to generate an approximated mesh for the object based on geometric surface data associated with the object;
processing, using the machine learning model, the origin point and the direction vector by:
excluding regions of the approximated mesh where collisions are unlikely based on a direction and a position of the ray;
calculating distances between the ray and relevant portions of the approximated mesh; and
responsive to the calculated distances indicating that the ray collides with the object, generating, using the machine learning model, a collision indication; and
updating, based on the collision indication, at least one of the object or the virtual environment to indicate the collision occurred.

18. The method of claim 17, wherein generating the collision indication comprises:
generating, by the machine learning model, collision data associated with the ray and the object in response to the calculated distances indicating that the ray collides with the object.

19. The method of claim 17, wherein setting the local-space intersection point as an origin point of the ray comprises:
normalizing the local-space intersection point to lay on a surface of a unit volume.

20. The method of claim 17, wherein determining the direction vector of the ray based on the local-space intersection point comprises:
normalizing the direction vector of the ray to the local-space intersection point; and transforming the normalized direction vector from world-space coordinates to local-space coordinates of the bounding volume.

\* \* \* \* \*